(12) United States Patent
Shinohara et al.

(10) Patent No.: US 9,243,645 B2
(45) Date of Patent: Jan. 26, 2016

(54) FIXTURE USED IN ROTARY MACHINE AND METHOD FOR TRANSPORTING ROTARY MACHINE

(75) Inventors: Hitoshi Shinohara, Hiroshima (JP); Mitsuhiko Ota, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 53 days.

(21) Appl. No.: 14/237,225

(22) PCT Filed: Dec. 2, 2011

(86) PCT No.: PCT/JP2011/077965
§ 371 (c)(1),
(2), (4) Date: Feb. 5, 2014

(87) PCT Pub. No.: WO2013/021515
PCT Pub. Date: Feb. 14, 2013

(65) Prior Publication Data
US 2014/0178119 A1    Jun. 26, 2014

(30) Foreign Application Priority Data
Aug. 8, 2011 (JP) ................................. 2011-173131

(51) Int. Cl.
*F16C 41/04* (2006.01)
*F04D 29/044* (2006.01)
(Continued)

(52) U.S. Cl.
CPC .............. *F04D 29/044* (2013.01); *F04D 17/12* (2013.01); *F04D 29/051* (2013.01); *F04D 29/624* (2013.01); *F04D 29/628* (2013.01); *F04D 29/644* (2013.01); *F04D 29/648* (2013.01); *F16C 41/04* (2013.01); *F16J 15/3464* (2013.01); *F16C 17/03* (2013.01); *Y10T 29/49826* (2015.01); *Y10T 403/1608* (2015.01)

(58) Field of Classification Search
CPC ...................................................... F16C 41/04
See application file for complete search history.

(56) References Cited

U.S. PATENT DOCUMENTS 6,098,263 A * 8/2000 Subler et al. .................. 384/448
7,857,578 B2 * 12/2010 Urac et al. ..................... 415/107
(Continued)

FOREIGN PATENT DOCUMENTS

CH        350153      11/1960
DE        618609      8/1935
(Continued)

OTHER PUBLICATIONS

International Search Report issued Feb. 14, 2012 in International (PCT) Application No. PCT/JP2011/077965 with English translation.

(Continued)

*Primary Examiner* — Thomas R. Hannon
(74) *Attorney, Agent, or Firm* — Wenderoth, Lind & Ponack, L.L.P.

(57) ABSTRACT

A fixture used in a rotary machine which includes a rotary unit which has a rotary shaft, and a stationary unit which rotatably supports the rotary shaft, includes: a plate which comes into contact with an end portion of the rotary shaft; a fastening member which fixes the plate to the end portion of the rotary shaft; and a constraining member which connects the plate and the stationary unit, and constrains the plate from moving with respect to the stationary unit in an axial direction and a rotation direction.

6 Claims, 6 Drawing Sheets

(51) Int. Cl.
*F04D 29/62* (2006.01)
*F04D 29/64* (2006.01)
*F04D 17/12* (2006.01)
*F04D 29/051* (2006.01)
*F16J 15/34* (2006.01)
*F16C 17/03* (2006.01)

(56) References Cited

U.S. PATENT DOCUMENTS

| | | |
|---|---|---|
| 2003/0147742 A1 | 8/2003 | Thomas |
| 2006/0257202 A1 | 11/2006 | Bexten et al. |

FOREIGN PATENT DOCUMENTS

| | | | |
|---|---|---|---|
| DE | 1 166 350 | | 3/1964 |
| DE | 1 166 915 | | 4/1964 |
| DE | 1 167 967 | | 4/1964 |
| DE | 977133 | * | 4/1965 |
| DE | 1 933 812 | | 3/1971 |
| EP | 2 014 878 | | 1/2009 |
| JP | 58-037794 | | 8/1983 |
| JP | 58-158198 | | 10/1983 |
| JP | 59-194144 | | 11/1984 |
| JP | 60-12804 | | 1/1985 |
| JP | 62-267505 | | 11/1987 |
| JP | 2-17236 | | 1/1990 |
| JP | 03-107582 | | 5/1991 |
| JP | 03-202693 | | 9/1991 |
| JP | 2007-57830 | | 3/2007 |
| JP | 2009-185804 | | 8/2009 |
| JP | 2009-185904 | | 8/2009 |
| JP | 2010-151283 | | 7/2010 |
| JP | 2011-4567 | | 1/2011 |

OTHER PUBLICATIONS

Written Opinion of the International Searching Authority issued Feb. 14, 2012 in International (PCT) Application No. PCT/JP2011/077965 with English translation.

Extended European Search Report issued Jul. 22, 2015 in corresponding European Application No. 11870702.5.

Notice of Reasons for Rejection issued Apr. 21, 2015 in corresponding Japanese Application No. 2011-173131 (with English translation).

* cited by examiner

FIXTURE USED IN ROTARY MACHINE AND METHOD FOR TRANSPORTING ROTARY MACHINE

BACKGROUND OF THE INVENTION

1. Technical Field

The present invention relates to a fixture used in a rotary machine in order to prevent backlash of a rotary unit with respect to a stationary unit, and to a method for transporting the rotary machine using the fixture.

Priority is claimed from Japanese Patent Application No. 2011-173131, filed Aug. 8, 2011, the content of which is incorporated herein by reference.

2. Background Art

A rotary machine such as a centrifugal compressor includes a rotary unit in which various members are attached to a rotary shaft, and a stationary unit which rotatably supports the rotary shaft. For example, when the rotary machine is transported to a customer for delivery, backlash occurs in the rotary unit with respect to the stationary unit by vibration during transportation. When damage to the rotary unit or the stationary unit occurs due to such backlash, there is a problem in that the performance of the rotary machine is impaired.

In particular, when a so-called dry gas seal is disposed in a gap between the rotary unit and the stationary unit in order to prevent gas inside the rotary machine from leaking out, the problem of backlash becomes significant in the rotary unit. This is because the dry gas seal has a precise internal structure which is likely to be damaged and lose function due to such vibrations.

In this regard, a rotary machine includes a vibration-proof structure for preventing shaking, during an operation of the rotary machine (for example, refer to Patent Document 1). However, according to the vibration-proof structure, shaking of the entire rotary machine can be reduced, but backlash of the rotary unit with respect to the stationary unit cannot be prevented.

Therefore, as means for preventing backlash of the rotary unit with respect to the stationary unit, a fixture has been proposed which is used in the rotary machine for fixing the rotary unit so as not to move with respect to the stationary unit. The fixture used in the rotary machine is configured to have an axial direction fixture which fixes the rotary unit so as not to be slidable in an axial direction and a rotation direction fixture which fixes the rotary unit so as not to be rotatable in a rotation direction. According to the fixture which is used in the rotary machine configured as described above, since the rotary unit is fixed with respect to the stationary unit in the axial direction and the rotation direction, it is possible to reliably prevent backlash from occurring in the rotary unit. This enables a rotary machine having a dry gas seal to be safely and reliably transported without degrading the performance of the dry gas seal.

RELATED ART DOCUMENT

Patent Document

[Patent Document 1] Japanese Unexamined Patent Application, First Publication No. S59-194144

Problem to be Solved by the Invention

Since the fixture used in the rotary machine of the related art is configured to have both a radial direction fixture and a rotation direction fixture, a large number of components are required. Therefore, there is a problem in that the entire rotary machine is increased in size, the cost is increased and the maintenance is complicated.

SUMMARY OF THE INVENTION

The present invention has been made in consideration of such circumstances, and an object thereof is to provide a fixture which can prevent backlash of a rotary unit with respect to a stationary unit by using a minimized configuration when a rotary machine is transported.

Means for Solving the Problem

In order to achieve the above-described object, the present invention has adopted the following solutions.

According to the present invention, there is provided a fixture used in a rotary machine including: a rotary unit which has a rotary shaft, and a stationary unit which rotatably supports the rotary shaft. The fixture includes: a plate which comes into contact with an end portion of the rotary shaft; a fastening member which fixes the plate to the end portion of the rotary shaft; and a constraining member which connects the plate and the stationary unit, and constrains the plate from moving with respect to the stationary unit in an axial direction and a rotation direction.

According to this configuration, the plate which comes into contact with the end portion of the rotary shaft is integrated with and fixed to the rotary shaft by the fastening member. Then, the plate is constrained from moving with respect to a stationary member in the axial direction and the rotation direction by the constraining member. Therefore, the rotary shaft integrated with the plate is also constrained from moving with respect to the stationary member in the axial direction and the rotation direction. In this manner, backlash of the rotary unit having the rotary shaft is prevented from occurring with respect to the stationary unit when the rotary machine is transported.

The stationary unit of the rotary machine may have a thrust bearing which receives a force applied in the axial direction from an end portion of the rotary shaft and rotatably supports the rotary shaft, and the plate may come into contact with an opposite side end portion to the end portion of the rotary shaft disposed in the thrust bearing.

According to this configuration, the rotary shaft whose end portion of the plate is constrained by the constraining member is allowed to be in a state where the opposite side end portion is supported by the thrust bearing. Therefore, since both end portions thereof are supported, the rotary shaft can be transported in a stable state.

The stationary unit of the rotary machine may include: a cylindrical casing; a head which is disposed in an end portion of the casing so as to seal a gap between the rotary shaft and the casing; and a journal bearing which is fixed to the head, receives a force applied from the rotary shaft in the radial direction, and rotatably supports the rotary shaft. The constraining member may be a bolt, and the bolt may be screwed into a screw hole provided in the journal bearing so as to fix the head.

According to this configuration, since the bolt serving as the constraining member is screwed into the screw hole disposed in the journal bearing, the rotary shaft is constrained from moving with respect to the journal bearing which is a portion of the stationary member in the axial direction and the rotation direction. In this manner, by using a simple configuration, it is possible to constrain the rotary unit from moving with respect to the stationary unit in the axial direction and the rotation direction.

According to the present invention, there is provided a method for transporting a rotary machine including: a rotary unit which has a rotary shaft, and a stationary unit which rotatably supports the rotary shaft. The method includes a step of constraining the rotary shaft from moving with respect to the stationary unit in an axial direction and a rotation direction by means of the fixture used in the rotary machine according to the present invention.

According to this configuration, it is possible to transport the rotary machine in a state where the rotary unit is constrained from moving with respect to the stationary unit in the axial direction and the rotation direction. Therefore, it is possible to prevent the backlash of the rotary unit from occurring with respect to the stationary unit due to vibrations during the transportation. Accordingly, it is possible to safely and reliably transport the rotary machine.

Effect of the Invention

According to the fixture of the present invention which is used in the rotary machine, by using a minimized configuration, it is possible to prevent backlash of the rotary unit from occurring with respect to the stationary unit when the rotary machine is transported. In this manner, it is possible to prevent the rotary machine from having a degraded performance due to damage to the rotary unit or the stationary unit when the rotary machine is transported.

BRIEF DESCRIPTION OF DRAWINGS

FIG. 4 illustrates an outer appearance of a plate, FIG. 4(*a*) is a schematic perspective view when viewed from a surface side, and FIG. 4(*b*) is a schematic perspective view when viewed from a rear surface side.

FIG. 7 illustrates a lock nut, FIG. 7(*a*) is a schematic plan view, and FIG. 7(*b*) is a cross-sectional view taken along line A-A in FIG. 7(*a*).

DESCRIPTION OF EMBODIMENTS

First Embodiment

Figure 1:
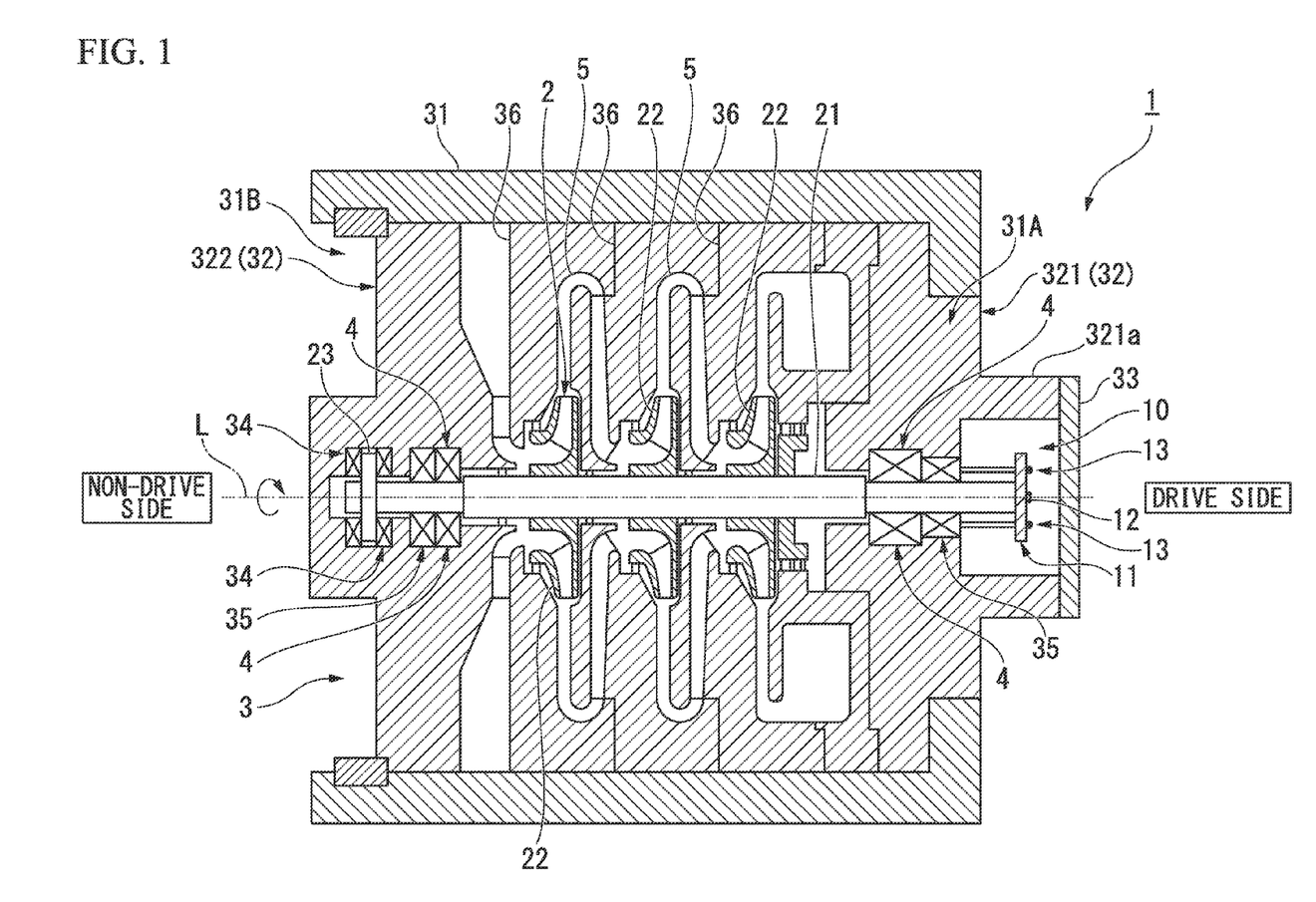
FIG. 1 is a schematic cross-sectional view illustrating a configuration of a centrifugal compressor according to a first embodiment of the present invention.

Hereinafter, an embodiment of the present invention will be described with reference to the drawings. First, a configuration will be described in which a fixture used in a rotary machine according to a first embodiment of the present invention is applied to a centrifugal compressor. FIG. 1 is a schematic cross-sectional view illustrating a configuration of a centrifugal compressor 1 according to the first embodiment.

As illustrated in FIG. 1, the centrifugal compressor 1 includes a rotor 2 (rotary unit), a casing 3 (stationary unit) which accommodates the rotor 2, and a pair of dry gas seals 4 which are disposed in a gap between the rotor 2 and the casing 3.

(Rotor)

As illustrated in FIG. 1, the rotor 2 has a rotary shaft 21, a plurality of impellers 22 and a thrust collar 23. The rotary shaft 21 is driven to rotate by a drive side end portion being connected to a motor (not illustrated). Here, an axis of the rotary shaft 21 is referred to as an axis L. The plurality of impellers 22 are fixed to a center portion of the rotary shaft 21 in an axial direction at a predetermined interval. The thrust collar 23 is formed in a disk shape and is fixed to an opposite side end portion (hereinafter, referred to as a non-drive side end portion) to a drive side end portion of the rotary shaft 21.

(Casing)

As illustrated in FIG. 1, the casing 3 has a casing body 31, a pair of heads 32, an end cover 33, a thrust bearing 34, a pair of journal bearings 35 and a plurality of diaphragms 36. The casing body 31 is formed in a substantially cylindrical shape, and both ends thereof have an opening. The pair of heads 32 are respectively disposed in the opening of both ends of the casing body 31. The end cover 33 covers an end portion of the heads 32 in the axial direction. The thrust bearing 34 is fixed to an inner peripheral surface of the heads 32. The pair of journal bearings 35 are fixed to the inner peripheral surface of the heads 32. The plurality of diaphragms 36 are fixed to an inner peripheral surface of the casing body 31.

The heads 32 seal the opening of both ends of the casing body 31. The pair of heads 32 include: a drive side head 321 disposed in the opening of a drive side end portion, and a non-drive side head 322 disposed in the opening of the non-drive side end portion.

As illustrated in FIG. 1, the drive side head 321 is a ring-shaped member. The drive side head 321 is formed to have an outer diameter which is substantially equal to an inner diameter of the casing body 31 and to have an inner diameter which is slightly larger than an outer diameter of the rotary shaft 21. The drive side head 321 has a hollow protruding portion 321*a* which is disposed to axially protrude from one end surface thereof. The drive side head 321 is fitted to an opening 31A of the drive side end portion in the casing body 31 in a state where the protruding portion 321*a* faces outward. A slight gap is formed between the drive side head 321 and the rotary shaft 21 inserted thereto.

The end cover 33 seals the drive side head 321. As illustrated in FIG. 1, the end cover 33 is a disk-shaped cover member. The end cover 33 is attached to a tip of the protruding portion 321*a* of the drive side head 321 so as to cover the opening. In this manner, an internal cavity of the protruding portion 321*a* is sealed.

As illustrated in FIG. 1, the non-drive side head 322 is a ring-shaped member similar to the drive side head 321. The non-drive side head 322 is formed to have an outer diameter which is substantially equal to the inner diameter of the casing body 31 and to have an inner diameter which is slightly larger than the outer diameter of the rotary shaft 21. The non-drive side head 322 is fitted to an opening 31B of the non-drive side end portion in the casing body 31. A slight gap is also formed between the non-drive side head 322 and the rotary shaft 21 inserted thereto.

The thrust bearing 34 receives a force applied from the rotary shaft 21 in the axial direction and rotatably supports the rotary shaft 21. That is, as illustrated in FIG. 1, the thrust bearing 34 supports the thrust collar 23 fixed to the non-drive side end portion of the rotary shaft 21 so as to be rotatable around the axis L and in a slightly movable state in the axial direction.

The pair of journal bearings 35 receive a force applied from the rotary shaft 21 in a radial direction and rotatably support the rotary shaft 21.

Figure 3:
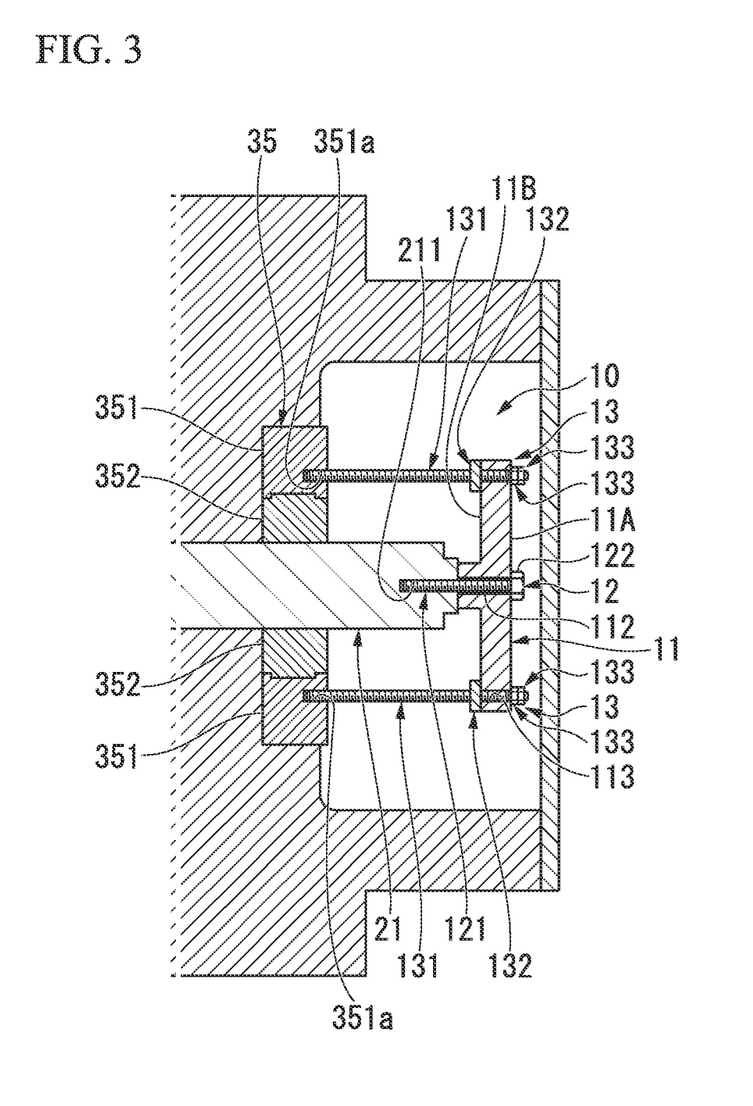
FIG. 3 is a schematic cross-sectional view in which a portion around a fixture in FIG. 1 is enlarged.

As illustrated in FIG. 3, the journal bearings 35 have an annular bearing housing 351 and a plurality of bearing pads 352 which are accommodated inside the bearing housing 351 and are arranged at a predetermined interval in a circumferential direction. The pair of journal bearings 35 rotatably support both end portions in the axial direction of the rotary shaft 21 so as to be rotatable around the axis L by allowing the bearing pads 352 to come into contact with a peripheral surface of the rotary shaft 21.

The plurality of diaphragms 36 forms a gas flow path inside the casing body 31. As illustrated in FIG. 1, the diaphragms 36 are formed so that an inner peripheral surface thereof has a predetermined shape. The plurality of diaphragms 36 is disposed on the inner peripheral surface of the casing body 31, and is fixed to a position opposing the impeller 22, in a state of being adjacent to each other. In this manner, a gas flow path 5 is formed inside the casing body 31 by the inner peripheral surface of the diaphragm 36 and the impeller 22.

(Dry Gas Seal)

Figure 2:
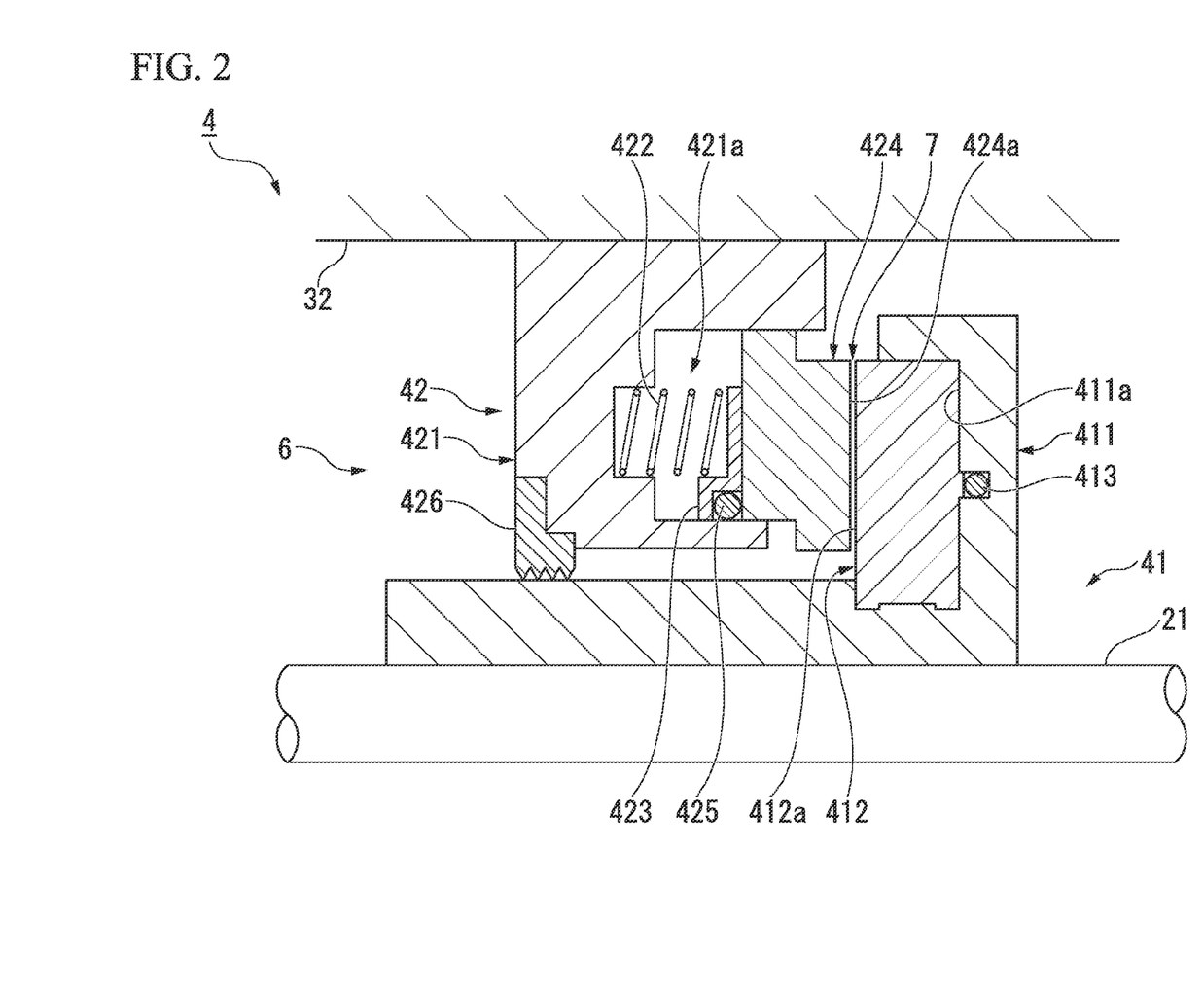
FIG. 2 is a schematic cross-sectional view illustrating a structure of a dry gas seal.

The dry gas seal 4 illustrated in FIG. 1 prevents gas from leaking out from a gap formed between the head 32 and the rotary shaft 21. FIG. 2 is a schematic cross-sectional view illustrating a structure of the dry gas seal 4. The dry gas seal 4 includes: a drive system unit 41 which is rotated integrally with the rotary shaft 21, and a stationary system unit 42 which is fixed to the head 32.

As illustrated in FIG. 2, the drive system unit 41 has a sleeve 411, a rotary ring 412 and an O-ring 413. The sleeve 411 is fixed to the outer peripheral surface of the rotary shaft 21, and a recess 411a is formed in one end portion thereof in the axial direction. The rotary ring 412 is fixed to the recess 411a of the sleeve 411. The O-ring 413 seals a portion between the rotary ring 412 and the sleeve 411. Here, although details are not illustrated in FIG. 2, a spiral groove is formed on a sealing surface 412a of the rotary ring 412, that is, on an end surface of the drive system unit 41.

As illustrated in FIG. 2, in general, the stationary system unit 42 has a retainer 421, a coil spring 422, a stationary ring 424, an O-ring 425 and a labyrinth 426. The retainer 421 is fixed to the inner peripheral surface of the head 32, and has a recessed groove 421a. One end of the coil spring 422 is attached to the recessed groove 421a of the retainer 421. The stationary ring 424 is attached to the other end of the coil spring 422 via a disk 423. The O-ring 425 seals a portion between the stationary ring 424 and the disk 423. The labyrinth 426 is fixed to the retainer 421 and seals a gap between the sleeve 411 and the retainer 421.

Although details are not illustrated in FIG. 2, according to the dry gas seal 4, when the rotation of the rotary shaft 21 is stopped, a biasing force of the coil spring 422 brings a sealing surface 424a of the stationary ring 424 (that is, an end surface of the stationary system unit 42) side into contact with the sealing surface 412a of the rotary ring 412.

On the other hand, if the rotary shaft 21 starts to rotate, internal gas of the centrifugal compressor 1 is introduced into a spiral groove (not illustrated) which is formed on the sealing surface 412a of the rotary ring 412. A dynamic pressure effect thereof causes the stationary ring 424 to move against the biasing force of the coil spring 422 in an inserting direction to the recessed groove 421a. As illustrated in FIG. 2, this produces a minute sealing gap 7 between the rotary ring 412 and the stationary ring 424. In this manner, the dry gas seal 4 prevents most of the gas from leaking out by causing the sealing gap 7 to be minute.

Next, a method for transporting the centrifugal compressor 1 according to the first embodiment of the present invention will be described. When the centrifugal compressor 1 is transported, as illustrated in FIG. 1, a fixture 10 is mounted on one end portion of the rotor 2 in the axial direction. First, a configuration of the fixture 10 will be described.

(Fixture)

The fixture 10 illustrated in FIG. 1 fixes the rotor 2 to the casing 3. Here, FIG. 3 is a schematic cross-sectional view in which a portion around the fixture 10 in FIG. 1 is enlarged. The fixture 10 has a plate 11, a fastening member 12 and a pair of constraining members 13. The plate 11 comes into contact with the drive side end portion of the rotary shaft 21. The fastening member 12 is attached to a center portion of the plate 11. The pair of constraining members 13 interposes the fastening member 12 therebetween, and are respectively disposed in both end portions in an extending direction of the plate 11.

Figure 4:
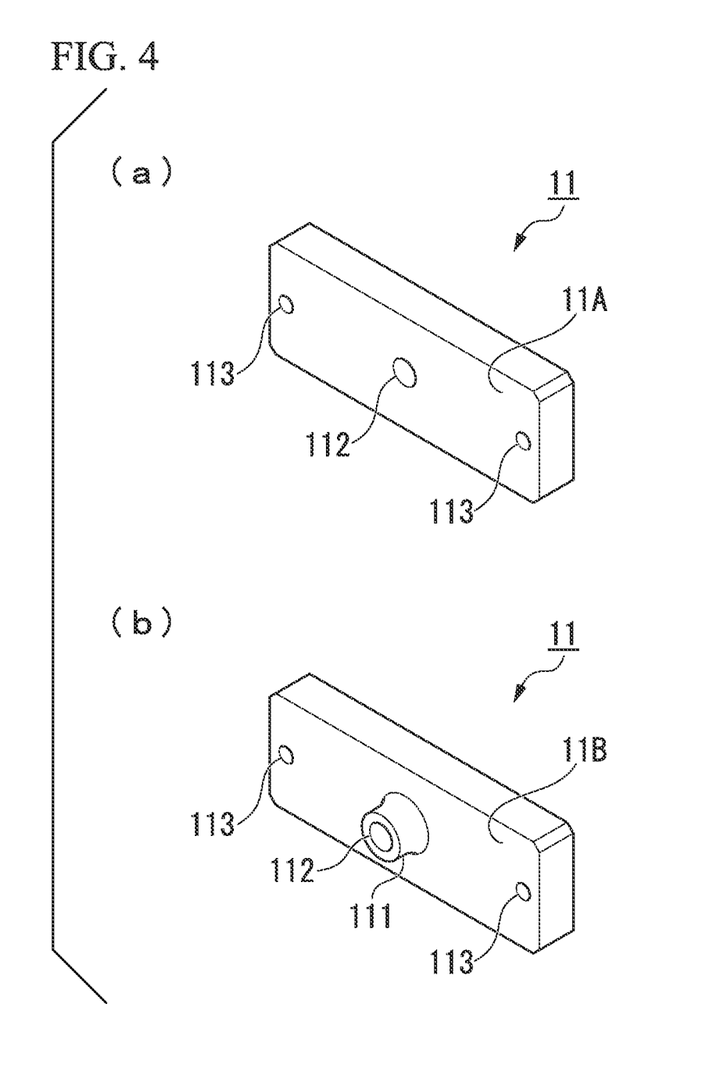

FIG. 4 illustrates an outer appearance of the plate 11, FIG. 4(a) is a schematic perspective view when viewed from a surface side, and FIG. 4(b) is a schematic perspective view when viewed from a rear surface side. The plate 11 is a substantially rectangular plate-shaped member. As illustrated in FIG. 4(b), a substantially cylindrical boss 111 is disposed to protrude in a longitudinal center portion on a rear surface 11B of the plate 11. Then, a first bolt insertion hole 112 for inserting the fastening member 12 is formed so as to pass through the boss 111 and reach a side of a surface 11A. In addition, a second bolt insertion hole 113 for inserting the constraining member 13 is formed so as to pass through both longitudinal ends of the plate 11. As illustrated in FIG. 3, the plate 11 is arranged in a state where the boss 111 is brought into contact with the drive side end portion of the rotary shaft 21.

Figure 5:
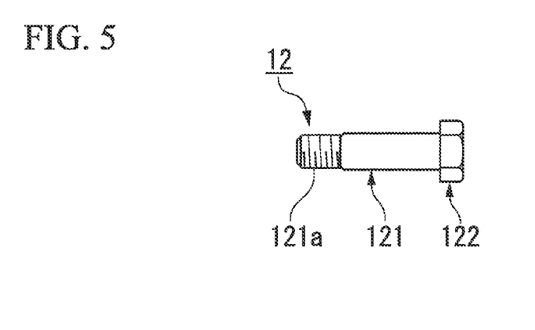
FIG. 5 is a schematic side view illustrating an outer appearance of a fastening member.

The fastening member 12 fixes the plate 11 to the rotary shaft 21 so as to integrate both of them. FIG. 5 is a schematic side view illustrating an outer appearance of the fastening member 12. The fastening member 12 is a so-called hexagon bolt. The fastening member 12 has a shaft portion 121 and a head portion 122. The shaft portion 121 has a slightly smaller diameter than that of the first bolt insertion hole 112 of the plate 11, and a male thread 121a is formed on a peripheral surface of the shaft portion 121. The head portion 122 is disposed in one end portion of the shaft portion 121 and has a larger diameter than that of the above-described bolt insertion hole. As illustrated in FIG. 3, in the fastening member 12, the shaft portion 121 is screwed to a first screw hole 211 disposed in the drive side end portion of the rotary shaft 21 until the shaft portion 121 is inserted into the first bolt insertion hole 112 of the plate 11 and the head portion 122 comes into contact with the plate 11. Although details are not illustrated, the first screw hole 211 is disposed in advance in order to attach a fixture for applying a hydraulic pressure, when a joint called a coupling is mounted on the drive side end portion of the rotary shaft 21.

The pair of constraining members 13 constrain the plate 11 and the rotary shaft 21 which are integrated together so as not to be movable to the casing 3. As illustrated in FIG. 3, the constraining members 13 have a long fixing bolt 131, a lock nut 132 screwed to the fixing bolt 131, and a pair of hexagon nuts 133 screwed to the fixing bolt 131.

Figure 6:
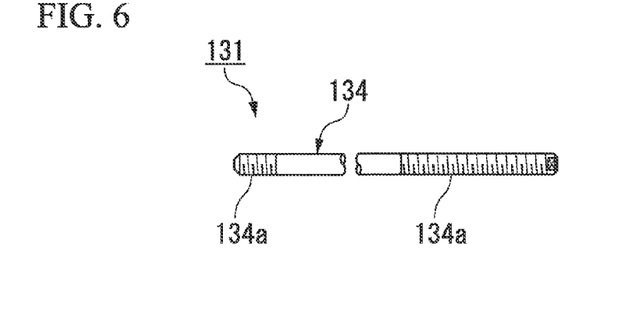
FIG. 6 is a schematic side view illustrating an outer appearance of a fixing bolt.

FIG. 6 is a schematic side view illustrating an outer appearance of the fixing bolt 131. The fixing bolt 131 is a so-called stud bolt which has no head portion. The fixing bolt 131 has a shaft portion 134 whose diameter is slightly smaller than that of the second bolt insertion hole 113 of the plate 11. Then, a male thread 134a is formed to have a predetermined length in both longitudinal end portions of the shaft portion 134. As illustrated in FIG. 3, the fixing bolt 131 is inserted into the second bolt insertion hole 113 of the plate 11, and the male thread 134a of the tip side is screwed to a second screw hole 351a disposed in a bearing housing 351 configuring the journal bearing 35 so as to have a predetermined depth. Here, a portion protruding axially outward from the plate 11 within the fixing bolt 131 is positioned inside the protruding portion 321a disposed in the drive side head 321. The second screw hole 351a of the bearing housing 351 is disposed in advance in order to fix the journal bearing 35 to the drive side head 321. The fixing bolt 131 is screwed to the bearing housing 351 and additionally a plurality of other second screw holes 351a are disposed in the bearing housing 351.

The lock nut 132 prevents the fixing bolt 131 from being loosened.

Figure 7:
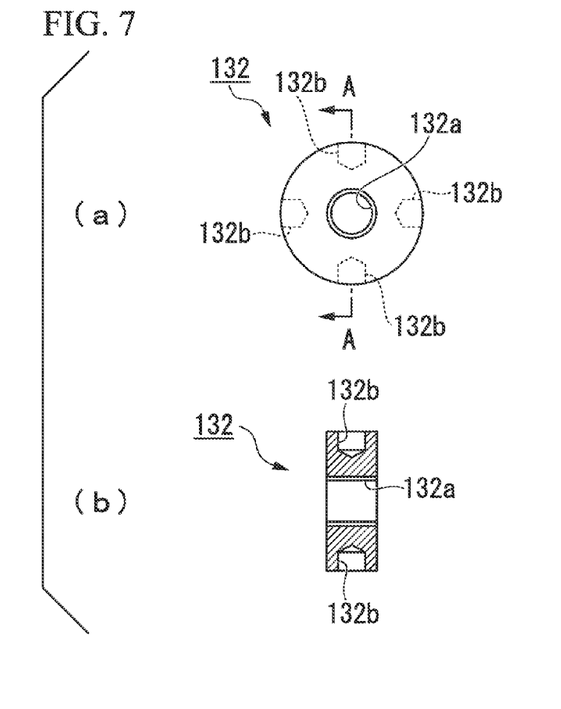

FIG. 7 illustrates the lock nut 132, FIG. 7(a) is a schematic plan view and FIG. 7(b) is a cross-sectional view taken along line A-A in FIG. 7(a). The lock nut 132 has a substantially circular outer appearance in a plan view, and has a third screw hole 132a in which a female thread is formed on an inner peripheral surface by penetrating a center of the lock nut 132. In addition, four spanner mounting grooves 132b are respectively formed at 90° intervals in the circumferential direction on an outer peripheral surface of the lock nut 132. The spanner mounting grooves 132b are grooves for fitting a tip of a hexagonal wrench key used when fastening the lock nut 132. As illustrated in FIG. 3, the lock nut 132 is screwed to an axially further inner side position than the plate 11 in the fixing bolt 131.

The pair of the hexagon nuts 133 adjust a depth of the fixing bolt 131 screwed to the second screw hole 351a. The pair of hexagon nuts 133 configure a so-called double nut, and push each other in the axial direction so that loosening of screws is less likely to occur. As illustrated in FIG. 3, the pair of hexagon nuts 133, in a state of close contact with each other, are respectively screwed to an axially further outer side position than the plate 11 in the fixing bolt 131.

(Mounting Procedure of Fixture and Effects)

Next, a procedure and effects when mounting the fixture 10 according to the first embodiment on one axial end portion of the rotor 2 will be described with reference to FIG. 3. A user of the fixture 10 first attaches the pair of fixing bolts 131 to the journal bearing 35. That is, the user screws one longitudinal end portion of the pair of fixing bolts 131 to the second screw hole 351a disposed in the bearing housing 351 of the journal bearing 35 respectively so as to have a predetermined depth.

Here, the second screw hole 351a of the journal bearing 35 is provided in advance in order to fix the journal bearing 35 to the drive side head 321 as described above. Accordingly, it is possible to attach the fixing bolt 131 to the journal bearing 35 by using the predisposed second screw hole 351a. In this manner, as compared to a case where the second screw hole 351a is newly provided in the bearing housing 351 in order to screw the fixing bolt 131, it is possible to simplify the structure and improve efficiency of the work.

Then, the user screws the other longitudinal end side of the pair of fixing bolts 131 to the lock nut 132 respectively so as to have a predetermined depth. Thereafter, the user attaches the plate 11 to the pair of fixing bolts 131. That is, the user inserts the pair of fixing bolts 131 respectively into the second bolt insertion holes 113 of the plate 11 in which the boss 111 faces a side of the rotary shaft 21. Then, the user brings the boss 111 of the plate 11 into contact with the drive side end portion of the rotary shaft 21.

Then, the user fixes the plate 11 to the rotary shaft 21 by using the fastening member 12. That is, the user inserts the fastening member 12 into the first bolt insertion hole 112 provided in the longitudinal center portion of the plate 11 from the shaft portion 121, and the tip portion of the shaft portion 121 is screwed to the first screw hole 211 of the rotary shaft 21. Then, the fastening member 12 is caused to fasten the head portion 122 to press the plate 11, thereby fixing the plate 11 to the rotary shaft 21. In this manner, the plate 11 and the rotor 2 are integrated with each other.

Here, the first screw hole 211 of the rotary shaft 21 is provided in advance in order to attach a fixture used when the coupling is mounted on the rotary shaft 21 as described above. Accordingly, it is possible to fix the plate 11 to the rotary shaft 21 by using the predisposed first screw hole 211. In this manner, as compared to a case where the first screw hole 211 is newly provided in the rotary shaft 21 in order to screw the fastening member 12, it is possible to simplify the structure and improve efficiency of the work.

Then, the user screws the pair of hexagon nuts 133 respectively to the fixing bolt 131. That is, the user sequentially screws the pair of hexagon nuts 133 to the other longitudinal end portion of the fixing bolt 131 protruding from the surface 11A of the plate 11. Then, the fixing bolt 131 is screwed to a deeper position of the second screw hole 351a by fastening the hexagon nuts 133. Then, following the movement of the pair of fixing bolts 131, the plate 11 and the rotor 2 integrated therewith are caused to move inward in the axial direction. In this manner, the thrust collar 23 fixed to the non-drive side end portion of the rotary shaft 21 as illustrated in FIG. 1 is pressed to the thrust bearing 34. In this manner, the rotor 2 including the rotary shaft 21 is constrained so as not to be movable in the axial direction.

At this time, the drive side end portion of the rotary shaft 21 is fixed to the journal bearing 35 by two fixing bolts 131, and thus is constrained so as not to be rotatable. In addition, the non-drive side end portion of the rotary shaft 21 is constrained so as not to be rotatable by a friction force acting between the thrust collar 23 and the thrust bearing 34. In this manner, the entire rotor 2 is constrained so as not to be rotatable.

Then, the user fastens the lock nut 132. That is, the user fits one end portion of a hexagonal wrench key (not illustrated) to the spanner mounting groove 132b of the lock nut 132 which is illustrated in FIG. 7, and properly manipulates the hexagonal wrench key. In this manner, the user moves the lock nut 132 to a side of the plate 11 along the fixing bolt 131 as illustrated in FIG. 3. This allows the plate 11 to be more reliably fastened by the hexagon nut 133. As a result, it is possible to prevent the hexagon nut 133 from being loosened due to vibrations or the like.

As illustrated in FIG. 3, after the user finally attaches the end cover 33 to the tip of the protruding portion 321a of the drive side head 321, the user fills the inside of the protruding portion 321a with nitrogen (not illustrated). This allows internal waterproofing to be maintained over a long period, when the centrifugal compressor 1 is transported. Here, as described above, the fixture 10 is entirely accommodated inside the protruding portion 321a. Thus, it is not necessary to dispose a hole or a notch in the end cover 33 which is required for avoiding interference from the fixture 10. Accordingly, it is possible to prevent the nitrogen filling the inside of the protruding portion 321a from leaking out via the hole or the notch.

As described above, according to the fixture 10 of the first embodiment, by using only one fixture, it is possible to constrain the rotor 2 so as not to be movable to the casing 3 in the axial direction and the rotation direction. In this manner, when the centrifugal compressor 1 is transported, by using a minimized fixture configuration, it is possible to prevent backlash of the rotor 2 with respect to the casing 3 due to the vibrations during the transportation. As a result, it is possible to safely and reliably transport the centrifugal compressor 1. In particular, when the centrifugal compressor 1 has the dry gas seal 4 as in the present embodiment, the rotary ring 412 and the stationary ring 424 which are illustrated in FIG. 2 are caused to rub against each other due to the vibrations during the transportation, thereby causing damage to a spiral groove (not illustrated) formed on the sealing surface 412a of the rotary ring 412. For this reason, the dry gas seal 4 is likely to lose the sealing performance. However, if the fixture 10 of the first embodiment is used to prevent the rotary ring 412 and the stationary ring 424 from rubbing against each other, it is possible to prevent a problem of the degraded sealing performance of the dry gas seal 4 in advance.

Modified Example

In the present embodiment, the double nut is configured by screwing two hexagon nuts 133 to one fixing bolt 131. However, it is possible to use only one hexagon nut 133. In addition, in the present embodiment, the lock nut 132 is screwed to the fixing bolt 131. However, the lock nut 132 may not be an essential configuring element in the present invention. It is possible to adopt a configuration without disposing the lock nut 132. In addition, in the present embodiment, since the non-drive side end portion of the rotary shaft 21 is supported by the thrust bearing 34, the fixture 10 is mounted only on the drive side end portion of the rotary shaft 21. However, when the centrifugal compressor 1 is not provided with the thrust bearing 34, the fixture 10 may be mounted on both sides of the drive side end portion and the non-drive side end portion of the rotary shaft 21. In this manner, the rotor 2 may be constrained so as not to be movable in the axial direction and the rotation direction.

Second Embodiment

Figure 8:
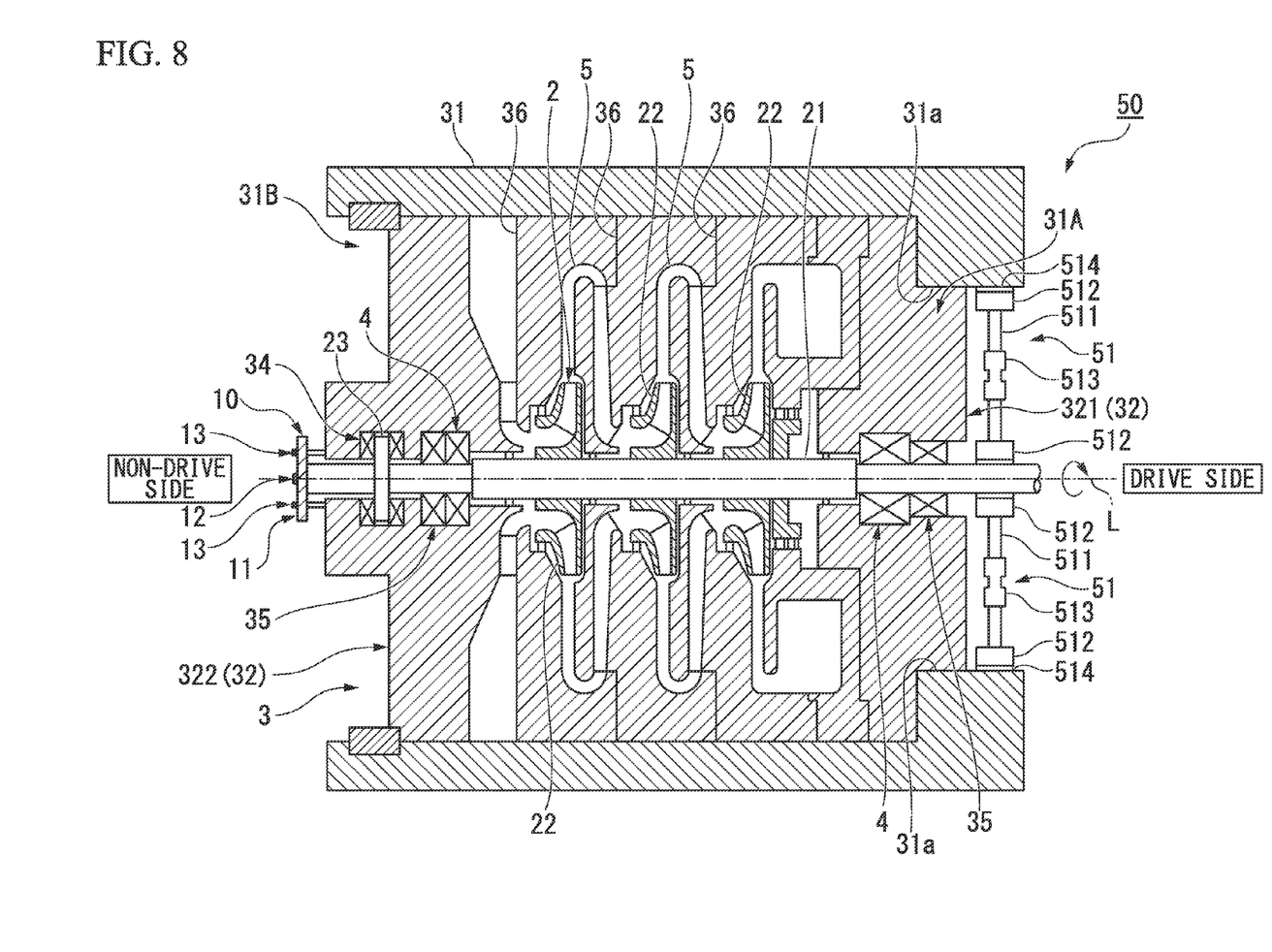
FIG. 8 is a schematic cross-sectional view illustrating a configuration of a centrifugal compressor according to a second embodiment of the present invention.

Next, a configuration of a centrifugal compressor will be described which employs a fixture used in a rotary machine according to a second embodiment. FIG. 8 is a schematic cross-sectional view illustrating a configuration of a centrifugal compressor 50 according to the second embodiment. The centrifugal compressor 50 of the present embodiment is different from the centrifugal compressor 1 of the first embodiment illustrated in FIG. 1 in that the fixture 10 is mounted on the non-drive side end portion of the rotary shaft 21 and a pair of auxiliary fixtures 51 are disposed in the drive side end portion of the rotary shaft 21. The other configurations are the same as those of the first embodiment. Therefore, the same reference numerals in FIG. 1 are given to configuring elements in FIG. 8. Here, description thereof will be omitted.

As illustrated in FIG. 8, similar to the first embodiment, the fixture 10 of the second embodiment also has the plate 11, the fastening member 12 and the pair of constraining members 13. However, in the present embodiment, the plate 11 is disposed to be in contact with the non-drive side end portion of the rotary shaft 21, and the fastening member 12 is screwed to the non-drive side end portion of the rotary shaft 21, thereby integrating the plate 11 and the rotor 2 with each other. Then, the present embodiment is different from the first embodiment where the pair of constraining members 13 constrain the journal bearing 35 in that the pair of constraining members 13 constrain the plate 11 and the rotor 2 which are integrated with each other from moving to the non-drive side head 322.

According to this configuration, if the fixture 10 is mounted on the non-drive side end portion of the rotary shaft 21, the thrust collar 23 fixed to the non-drive side end portion of the rotary shaft 21 is pressed to the thrust bearing 34. In this manner, the non-drive side end portion of the rotary shaft 21 is constrained so as not to be movable in the axial direction and the rotation direction by using both of the fixture 10 and the thrust bearing 34. However, in the present embodiment, unlike the first embodiment where the drive side end portion of the rotary shaft 21 is constrained by the fixture 10, the drive side end portion of the rotary shaft 21 is a free end which receives no constrains. Accordingly, in the present embodiment, in order to more reliably constrain the rotary shaft 21, the drive side end portion of the rotary shaft 21 is constrained by the pair of auxiliary fixtures 51.

As illustrated in FIG. 8, the auxiliary fixture 51 includes: a shaft portion 511; a pair of pressing portions 512 disposed in both longitudinal end portions of the shaft portion 511; and an adjustment portion 513 which can adjust a length of the shaft portion 511. In the pair of pressing portions 512 respectively, a Teflon (Trademark) sheet 514 adheres to the opposite side surface to the shaft portion 511.

Then, as illustrated in FIG. 8, the pair of auxiliary fixtures 51 are respectively arranged between the casing body 31 and the rotary shaft 21. The pair of auxiliary fixtures 51 are configured so that the length of the shaft portion 511 is properly adjusted via the adjustment portion 513. In this manner, the pair of auxiliary fixtures 51 are respectively installed so that one pressing portion 512 presses a peripheral surface of the rotary shaft 21 and the other pressing portion 512 presses the inner peripheral surface 31a of the casing body 31. In this manner, the drive side end portion of the rotary shaft 21 receives the pressing force from the pair of auxiliary fixtures 51, thereby being constrained so as not to be movable in the axial direction and the rotation direction.

The configuration or the number of the auxiliary fixtures 51 is not limited to the present embodiment, and can be appropriately changed in design. In addition, the auxiliary fixtures 51 may not be an essential configuring element of the present invention. However, it is preferable to constrain the drive side end portion of the rotary shaft 21 by using the auxiliary fixtures 51 as in the present embodiment, since the entire rotary shaft 21 can be reliably constrained.

The various shapes, combinations, or operation procedures of the respective configuring members in the above-described embodiments have been described as an example, and can be modified in various ways based on design requirements in a range without departing from the spirit of the present invention.

INDUSTRIAL APPLICABILITY

According to a fixture used in a rotary machine of the present invention, by using a minimized configuration, it is possible to prevent backlash of a rotary unit with respect to a stationary unit when the rotary machine is transported. In this manner, it is possible to prevent the rotary machine from having a degraded performance due to damage to the rotary unit or the stationary unit when the rotary machine is transported.

REFERENCE SIGNS LIST 1 centrifugal compressor
2 rotor
3 casing
4 dry gas seal
5 gas flow path
6 gap
7 seal gap
10 fixture
11 plate
12 fastening member
13 constraining member
21 rotary shaft
22 impeller
23 thrust collar
31 casing body
32 head
33 end cover
34 thrust bearing
35 journal bearing
36 diaphragm
41 drive system unit
42 stationary system unit
50 centrifugal compressor
51 auxiliary fixture
111 boss
112 first bolt insertion hole
113 second bolt insertion hole
121 shaft portion
122 head portion
131 fixing bolt
132 lock nut
133 hexagon nut
134 shaft portion
211 first screw hole
321 drive side head
322 non-drive side head
351 bearing housing
352 bearing pad
411 sleeve
412 rotary ring
413 O-ring
421 retainer
422 coil spring
423 disk
424 stationary ring
425 O-ring
426 labyrinth
511 shaft portion
512 pressing portion
513 adjustment portion
514 Teflon (Trademark) sheet
11A surface
11B rear surface
121a male thread
132a third screw hole
132b spanner mounting groove
134a male thread
31A opening
31a inner peripheral surface
31B opening
321a protruding portion
351a second screw hole
411a recess
412a sealing surface
421a recessed groove
424a sealing surface

The invention claimed is:

1. A fixture used in a rotary machine including a rotary unit which includes a rotary shaft, and a stationary unit which rotatably supports the rotary shaft, the fixture comprising:
a plate which is configured to come into contact with an end portion of the rotary shaft;
a fastening member which fixes the plate to the end portion of the rotary shaft; and
a constraining member which connects the plate and the stationary unit, and is configured to constrain the plate from moving with respect to the stationary unit in an axial direction and a rotation direction,
wherein the stationary unit of the rotary machine comprises a cylindrical casing and a head which is provided in an end portion of the cylindrical casing so as to seal a gap between the rotary shaft and the cylindrical casing, and
wherein the constraining member is a bolt which is configured to be screwed into a screw hole provided in the head.

2. The fixture used in a rotary machine according to claim 1,
wherein the stationary unit of the rotary machine comprises a thrust bearing which is configured to receive a force applied in the axial direction from the end portion of the rotary shaft and rotatably supports the rotary shaft, and
wherein the plate is configured to come into contact with an opposite side end portion to the end portion of the rotary shaft provided in the thrust bearing.

3. The fixture used in a rotary machine according to claim 1,
wherein the stationary unit of the rotary machine further comprises a journal bearing which is fixed to the head, is configured to receive a force applied from the rotary shaft in the radial direction and rotatably supports the rotary shaft, and
wherein the bolt is configured to be screwed into a screw hole provided in the journal bearing.

4. A method for transporting a rotary machine that includes a rotary unit which includes a rotary shaft and a stationary unit which rotatably supports the rotary shaft, the method comprising:
constraining the rotary shaft from moving with respect to the stationary unit in an axial direction and a rotation direction using the fixture used in a rotary machine, according to claim 1.

5. The fixture used in a rotary machine according to claim 1,
wherein fastening member extends through the plate.

6. The fixture used in a rotary machine according to claim 1,
wherein the fastening member comprises a head and a body, and
wherein the head of the fastening member is disposed on a first side of the plate, a first portion of the body of the fastening member is surrounded by the plate, and a second portion of body of the fastening member is disposed on a second side of the plate that is opposite to the first side of the plate.

* * * * *